Jan. 13, 1959   F. LYIJYNEN   2,868,942
APPARATUS FOR FORMING LAMINATED MATERIAL
Filed May 9, 1956
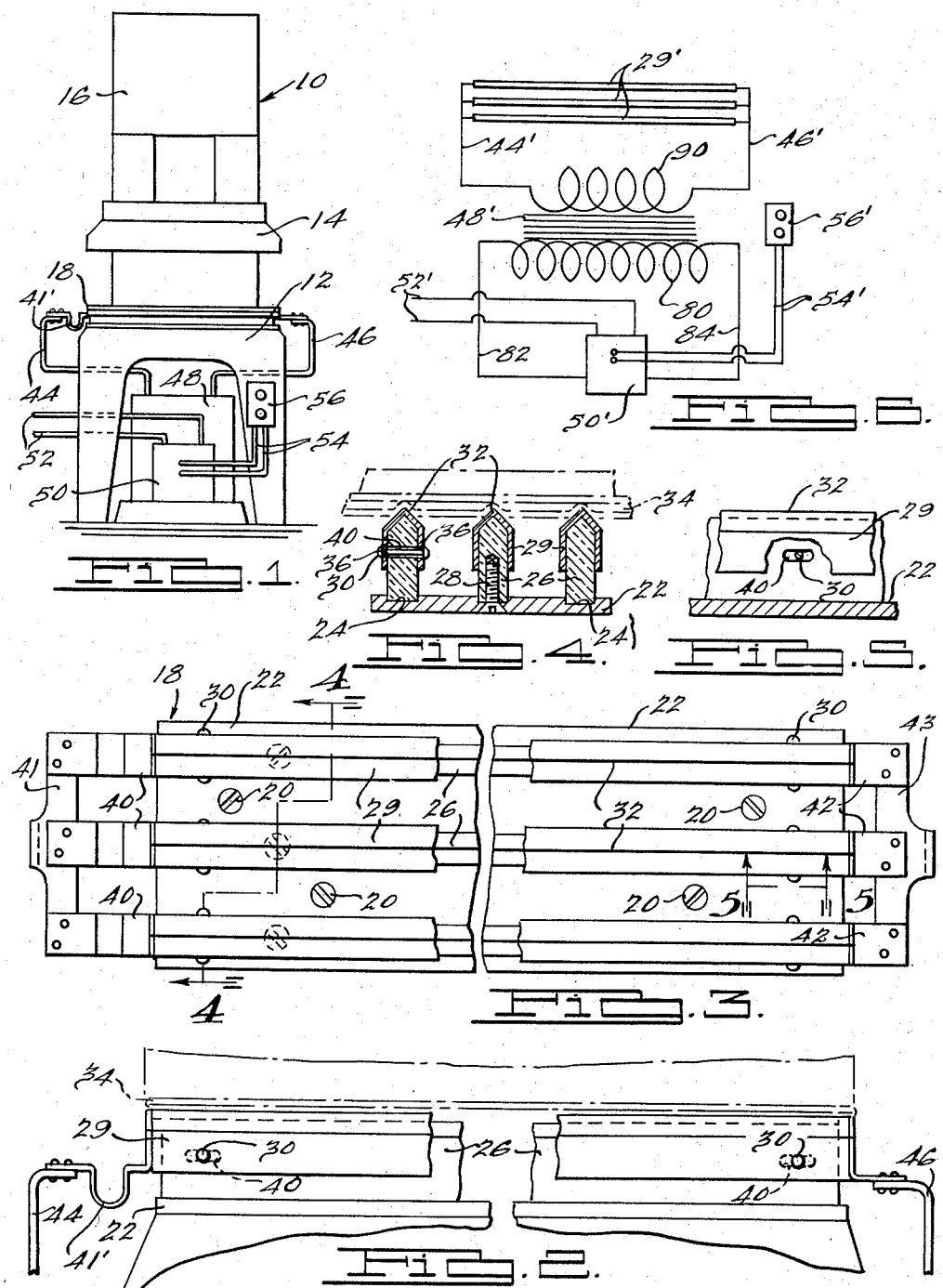
INVENTOR
Fred Lyijynen,
BY Harness and Harris
ATTORNEYS.

United States Patent Office 2,868,942
Patented Jan. 13, 1959

2,868,942

APPARATUS FOR FORMING LAMINATED MATERIAL

Fred Lyijynen, Detroit, Mich., assignor to Chrysler Corporation, Highland Park, Mich., a corporation of Delaware Application May 9, 1956, Serial No. 583,839

6 Claims. (Cl. 219—19)

The present invention relates to apparatus for forming laminated articles and has particular reference to an improved apparatus for applying heat and pressure to layers of materials to form the laminated articles.

In the past, laminated articles such as trim panels for automobiles and the like have been formed by placing layers of material between die members in a press and thereafter applying heat and pressure. Various types of apparatus have been used in the past to apply heat to the layers of the article to accommodate the bonding operation.

The principal object of the present invention is to provide an improved apparatus for bonding laminated materials which is capable of performing the bonding operation at a considerably faster rate than other apparatus known in the art.

Another object of the invention is to provide an improved apparatus for bonding layers of material together at predetermined locations which accommodates the use of a greater selection of materials than others known in the art.

Other objects of the invention include the provision of an apparatus for bonding layers of materials into a laminated article which produces a better article faster, requires less material handling by fewer personnel, and is considerably more economical to operate.

More particularly, my invention relates to an improved apparatus for bonding layers of material into a laminated article wherein the die members are heated to the desired temperature very quickly and efficiently. The invention includes the utilization of a transformer having a secondary of extremely high current carrying capacity which is connected through very low resistance conductors to the die members. The die members act as the load for the secondary circuit of the transformer. The resistance of the die members is very low thereby causing a great amount of current to flow in the circuit. As a result, the die member must dissipate the power generated by the emanation of heat therefrom.

Other subjects and advantages will become more apparent from the following description of one embodiment of my invention, reference being had to the accompanying drawings in which:

Fig. 1 is an elevational view of a press embodying my invention.

Fig. 2 is a side elevational view of a die element having portions broken away to more clearly illustrate the invention.

Fig. 3 is a plan view of the die elements shown in Fig. 2.

Fig. 4 is a transverse section taken on the line 4—4 of Fig. 3.

Fig. 5 is a fragmentary elevational view taken in the direction of the arrows 5—5 of Fig. 3.

Fig. 6 is an electrical diagram of the invention.

Referring now to the drawings in Fig. 1, I have shown an hydraulically operated mechanism, generally indicated by the numeral 10, including a stand 12, a platen 14 and hydraulic means 16 which moves the platen 14 toward and away from the stand 12.

My invention deals primarily with a die member 18 which is secured by bolts 20 to the stand 12. The member 18 includes a base 22 which is preferably formed of steel to insure rigidity but may be formed of any suitable material and which is directly secured to the stand 12 by the bolts 20. The base 22 is provided with elongated grooves 24 which receive elongated non-conducting support members 26, the latter being formed preferably of a hard non-metallic material. The bottoms of the support member 26 are tapped at spaced locations to thereby receive screws 28, as more clearly shown in Fig. 4, to secure the support members to the base 22. The tops of the support members 26 receive elongated die elements 29 and are secured thereto by pins 30. The tops of the support members 26 are formed to re-enforce and to conform with the configuration of the die elements 29. The die elements 29 are of an inverted U-shaped cross sectional configuration wherein the bite portions are pointed to form elongated ridges 32, the latter being utilized to engage the material 34 to be treated. Each of the die elements 29 are provided in their side walls at spaced locations with aligned openings 36, as more clearly seen in Fig. 4, which receive the pins 30 therethrough. The pins 30 also pass through slots 40 disposed in support members 26. The slots 40 are, of course, aligned with the openings 36 and are considerably larger than the latter, as more clearly shown in Fig. 2, to accommodate relative longitudinal movement between the die elements and their support members 26. In view of the fact that the die elements are subjected to heat during the operating cycle of the device, they are also subject to expansion and contraction. The enlarged slots 40 in the support members therefore permit this expansion and contraction.

The die elements 29 may be formed of any suitable conductive material as, for example, materials of the sheet metal variety. Stainless steel has been found to be very satisfactory. The opposite ends of the die elements 29 are secured, as by silver soldering, to straps 40 and 42, the latter being connected to cross members 41 and 43 of conductors 44 and 46, respectively. The straps 40 are provided with a looped portion 41 to accommodate the aforementioned expansion and contraction of the die elements 29. The conductors 44 and 46, as shown in Fig. 1, extend downwardly, inwardly and then downwardly again into an electrical transformer 48. The conductors 44 and 46 connected with the die elements form the secondary circuit of the transformer. The conductors 44 and 46 are formed of material of relatively high conductivity as, for example, copper. It is, of course, advisable to form the conductors 44 and 46 out of more conductive material than the die elements 29 in view of the fact that the voltage drop of the secondary voltage of the transformer should be taken in the die elements and not in their connections with the transformer. The primary leads of the transformer 48 are not shown in Fig. 1 but are connected to a control box indicated at 50, both the transformer 48 and the control box 50 being disposed under the stand 12. The control box 50 is supplied with input cables 52 which supply the electrical power to the system and with control cables 54 which connect a switch box 56 in the system. The switch box 56 is mounted on the side of the stand 12 as shown in Fig. 1. The control box 50 is shown in block form for the purpose of simplicity and contains conventional timing means and switching means for coordinating the operation of the transformer 48 with the hydraulic means 16 so that the transformer may be energized when the hydraulic means 16 moves the platen 14 into engagement with the material 34 disposed on the die elements.

In Fig. 6 I have shown a schematic diagram wherein primed numerals have been used. The transformer 48' has its primary winding 80 connected through primary conductors 82 and 84 to the control box 50'. The transformer 48' is also provided with a secondary winding 90 which is connected through conductors 44' and 46' to the parallel connected die elements 29'. Power connectors 52' are connected to the control box 50' and it should be understood that under proper timing conditions these connectors are connected to the conductors 82 and 84 to thereby energize the primary winding of the transformer 48'. This proper circuit condition may be realized by operation of the switch in the switch box 56', the latter being connected to the control box 50' by the connectors 54', it being understood that the control box 50' contains conventional type of timing and switching means to effect proper operation.

In operation, the power input cables 52 are connected to a source of electrical energy as, for example, 110 or 220 volts alternating current, and material 34 is placed on the die elements 29 as shown in Fig. 2. Thereafter, the mechanism in the switch box 56 is manually energized to thereby start the platen 14 moving downwardly under hydraulic pressure afforded by the hydraulic means 16. When the platen 14 reaches the material 34, the timing and switching mechanism within the control box 50 causes the connection of the input connectors 52 to the primary winding 80 of the transformer 48. Instantaneously, of course, electrical energy is transformed from the primary winding 80 to the secondary winding 90 and hence, through the connectors 44 and 46 to the die elements 29. The turns ratio of the primary winding 80 to the secondary winding 90 are predetermined so that the primary circuit is of the high voltage low current variety and the secondary circuit is stepped down to a low voltage high current type. A secondary voltage of six volts has been found to be very satisfactory. As a result of the large amount of current flowing through the die elements 29, power is dissipated therefrom in the form of heat which causes the molding operation desired.

It will be seen, therefore, that by employing my improved device great savings in power may be afforded in view of the fact that it is not necessary to continuously supply heat to the die elements when the actual molding operation is not being carried on. It will also be seen that many advantages exist in view of the fact that the die elements may be brought to operating temperature in such a short period of time. For example, some types of fabric may be employed in the molding operation when using the instant device where they could not be used in devices where a longer heating and molding operation is necessary.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto:

I claim:

1. Apparatus for bonding a plurality of layers of materials at a predetermined location comprising first and second press members, power means connected to said press members for accommodating pressure engagement therebetween, die means carried by one of said press members including a combined heating and die element of a generally inverted U-shaped configuration having a contact surface in the bite portion thereof adapted to engage said layers at said predetermined location to effect a bond therebetween, an electrical transformer having a high voltage low current primary winding and a low voltage high current secondary winding, switch means operatively connected with one of said windings for controlling operation of said transformer, and circuit means connecting the secondary winding of said transformer with said combined heating and die element to effect instantaneous heating thereof.

2. The subject matter of claim 1 including non-conducting support means disposed between said heating and die element and said one of said press members, and means interconnecting said heating and die element and said support means to accommodate relative movement therebetween.

3. Apparatus for bonding a plurality of layers of materials at a predetermined location comprising first and second press members, power means connected to said press members for accommodating engagement therebetween, die means carried by one of said press members including a combined heating and die element of a generally inverted U-shaped configuration having a contact surface in the bite portion thereof adapted to engage said layers at said predetermined location to effect a bond therebetween, and means connected to said element to effect heating thereof.

4. Apparatus for bonding a plurality of layers of materials at a predetermined location comprising first and second press members, means connected to said press members for accommodating engagement therebetween, die means carried by one of said press members including a combined heating and die element having a contact surface adapted to engage said layers at said predetermined location to effect a bond therebetween, an electrical insulator interposed between said die element and said one of said press members, said insulator having portions reinforcing the contact surface of said die element, and electrical means connected to said die element for accommodating heating thereof.

5. The subject matter of claim 4, including a slidable connection between said insulator and said die element to accommodate expansion and contraction of said die element.

6. Apparatus for bonding a plurality of layers of material at a predetermined location comprising first and second press members, power means connected to said press members for accommodating pressure engagement therebetween, die means carried by one of said press members including a sheet metal heating and die element having a contact surface adapted to engage said layers at said predetermined location to effect a bond therebetween, non-conducting support means interposed between said die element and said one of said press members having portions reinforcing the contact surface of said die element, an electrical transformer having a high voltage low current primary winding and a low voltage high current secondary winding, switch means operatively connected to one of said windings for controlling operation of said transformer, and circuit means connecting the secondary winding of said transformer with said heating and die element to effect rapid heating thereof.

References Cited in the file of this patent

UNITED STATES PATENTS

| | | |
|---|---|---|
| 1,237,554 | Price | Apr. 21, 1917 |
| 1,721,099 | Wiegand | July 16, 1929 |
| 1,827,508 | Cope | Oct. 13, 1931 |
| 2,577,745 | Foster | Dec. 11, 1951 |
| 2,603,835 | Van Dyke | July 22, 1952 |
| 2,625,969 | Mann | Jan. 20, 1953 |
| 2,631,646 | Gannon et al. | Mar. 17, 1953 |
| 2,706,165 | Kosrgaard | Apr. 12, 1955 |
| 2,796,914 | Park | June 25, 1957 |